G. SIEBER.
MOTION TRANSMITTING DEVICE.
APPLICATION FILED FEB. 3, 1914.
1,191,131. Patented July 11, 1916.
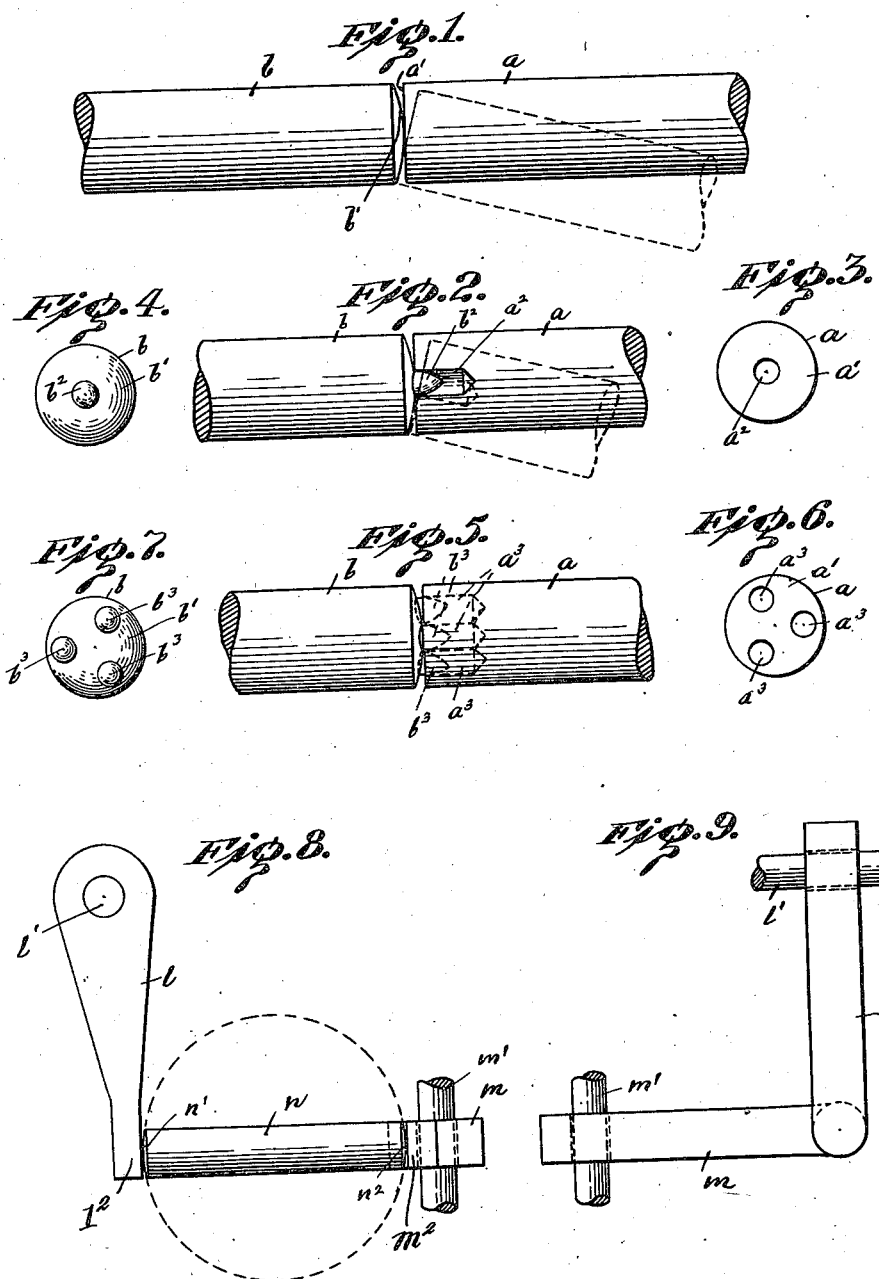

UNITED STATES PATENT OFFICE.

GOTTWALD SIEBER, OF PLAUEN, GERMANY, ASSIGNOR TO VOGTLÄNDISCHE MASCHINENFABRIK, OF PLAUEN, GERMANY.

MOTION-TRANSMITTING DEVICE.

1,191,131.  Specification of Letters Patent.  Patented July 11, 1916.

Application filed February 3, 1914. Serial No. 816,227.

*To all whom it may concern:*

Be it known that I, GOTTWALD SIEBER, a subject of the German Emperor, residing at Plauen, in Vogtland, in the Kingdom of Saxony, Germany, have invented certain new and useful Improvements in Motion-Transmitting Devices, of which the following is a specification.

The hitherto known universal joints, as for instance the cross joint and ring joints or the so-called Cardan rings, used to connect two bodies so that they are capable of universal movement relative to one another, are considerably expensive in construction and are therefore not applicable in cases where great quantities thereof are required. The well known ball joint is less expensive, but in connection with fine instruments as with monometers for connection of the small press piston with the dial work, it has the drawback, that when not carefully treated it ceases to move.

The object of my invention is to provide a device which is as well adapted for fine mechanisms and instruments as for heavy machinery, and which is simple and extraordinarily inexpensive in construction. The application of my new device, however, is limited to such cases wherein the transmission of movement is accomplished by push action and not by pull action.

The principle on which my invention is based is that between the bodies or parts from one of which motion is to be transmitted to the other, a member or link is interposed which has spherically-shaped end surfaces that are adapted to bear against plane surfaces of the said first named parts and to roll thereon in all directions almost entirely without friction. In order to prevent the said link from displacement relative to the driving and driven parts other than by rolling, one or more pointed or conical pins may be provided on each of the end surfaces of said link and holes made in the opposite driving and driven parts adapted to engage said pins. The joint thus formed between the link and the driving and driven parts constitutes a pressure joint which over pivotal joints has the advantage of not requiring any lubrication.

An embodiment of my invention is illustrated in the accompanying drawing, in which similar reference characters denote corresponding parts and in which—

Figure 1 is an elevation of a part of my device illustrating the principle of my invention; Fig. 2 is a similar view of a modified construction; Figs. 3 and 4 are face views of the adjoining parts shown in Fig. 2; Fig. 5 is a similar view to Fig. 1 of another modification; Figs. 6 and 7 are face views of the adjoining parts shown in Fig. 5 and Figs. 8 and 9 are views at a right angle to one another of my device illustrating one form of application thereof.

To illustrate the principle of my invention I shall first refer to Figs. 1 to 7 in which let it be assumed motion is to be transmitted from a part $a$ to another part (not shown) through the medium of a link $b$. Ordinarily in such cases in order to provide for freedom of movement in different directions of the parts universal or pivotal joints are used. To obviate the drawback to such joints heretofore referred to the link $b$ is formed at its end with spherically-shaped surfaces which are adapted to positively bear against and roll on the plane surfaces of the opposite driving and driven parts. The positive contact of the bearing surfaces is obtained by pressure. The link $b$ can transmit movement from the driving part to the driven part by push action only. In Fig. 1 one of the spherically-shaped surfaces $b'$ of the link $b$ is shown in contact with the plane face $a'$ of the part $a$. The rolling movement of the surface $b'$ on the plane $a'$ is indicated by dotted lines.

To prevent movement of the parts other than rolling, part $b$ may be provided with a pin $b^2$ or pins $b^3$, $b^3$, $b^3$ and the part $a$ with a hole $a^2$ or holes $a^3$, $a^3$, $a^3$, (Figs. 2–7) with which the pins engage.

In Figs. 8 and 9, for example, the driving and the driven parts are assumed to be lever arms $l$, $m$ rotatively mounted on axles $l'$ and $m'$ respectively, which are arranged crosswise to one another. The ends of the levers $l$ and $m$ are adapted to press with their ends $l^2$, $m^2$ having plane bearing surfaces against the link $n$ extending between the said levers and having spherically-shaped end surfaces $n'$, $n^2$.

What I claim and desire to secure by Letters Patent is:

1. The combination with a driving and a driven part, having plane surfaces, of a device for transmitting motion from one of said parts to the other, consisting of a link loosely interposed between said parts and having spherically-shaped end surfaces adapted to positively bear against said plane surfaces and to roll thereon during transmission of movement.

2. The combination with a driving and a driven part, having plane surfaces, of a device for transmitting motion from one of said parts to the other, consisting of a link loosely interposed between said parts and having spherically-shaped end surfaces adapted to positively bear against said plane surfaces and to roll thereon during transmission of movement and means for preventing said link from displacement relative to the said parts other than by rolling.

3. The combination with a driving and a driven part, having plane surfaces, of a device for transmitting motion from one of said parts to the other, consisting of a link loosely interposed between said parts and having spherically-shaped end surfaces adapted to positively bear against said plane surfaces and to roll thereon during transmission of movement and means for preventing said link from displacement relative to the said parts other than by rolling, said means comprising a conical pin projecting from each bearing surface of said link and engaging a hole in the opposite part.

In testimony whereof I affix my signature in presence of two witnesses.

GOTTWALD SIEBER.

Witnesses:
JOSEF GANZ,
ROBERT H. NIER.